Aug. 10, 1937.   C. BYERS   2,089,337

TIRE SPREADING TOOL

Filed July 25, 1936

INVENTOR.
CHARLEY BYERS
BY M. Talbert Dick
ATTORNEY.

Patented Aug. 10, 1937

2,089,337

UNITED STATES PATENT OFFICE 2,089,337

TIRE SPREADING TOOL

Charley Byers, Primgar, Iowa

Application July 25, 1936, Serial No. 92,593

4 Claims. (Cl. 152—27)

The principal object of my invention is to provide a tire spreading tool to be used in spreading the beads of a tire casing apart for inspecting the internal surface of the tire casing and which may be rolled about the inner circumference of the casing so that its entire inner area may be observed and inspected.

A further object of my invention is to provide a tire spreading tool of great leverage that applies the greater portion of the leverage against the beads of the tire casing when the handle lever of the device is traveling downwardly toward the casing.

A still further object of my invention is to provide a tire spreading tool wherein the spreading members consist of tapered rollers which allow the tool to be rolled around the inner circumference of the tire and at the same time hold the tool adjacent to the bead of the tire by virtue of the taper of the rollers.

A still further object of my invention is to provide a tire spreading tool that is adjustable for various sizes of tire casings and which will lock itself in an expanded position so that the operator of the device is free to inspect the tire.

A still further object of this invention is to provide a tire spreading tool that is economical in manufacture, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

It is highly desirable, when repairing a tire, to spread the bead of the tire apart so that the inner surface of the casing is readily exposed for examination and inspection. Often a small nail in the tire is hard to find except by spreading the tire and examining the entire inner surface of the tire. A number of devices are on the market for spreading casings, some of which are automatically operated by air or hydraulic pressure and which are bulky and are suitable for use only in large permanent installations. Several types of hand operated tire spreading tools are on the market which consist mainly of fingers and some sort of horizontal lever for pulling the fingers apart after they have been inserted between the beads of a tire casing. With the types of spreaders on the market, it is necessary to spread one portion of the casing then remove the device and insert it in another portion of the casing, thus requiring many applications of the device when inspecting the entire inner surface of the tire. Furthermore, the devices now on the market are unhandy in use, due to the fact that the lever for expanding them is moved away from the tire or in the same direction as the spreading action which it exerts on the tire casing. These devices also have a tendency to slip from the casing when the beads of the casing are extended or spread.

I have overcome these disadvantages as will be appreciated and as hereinafter set forth.

Figure 1:
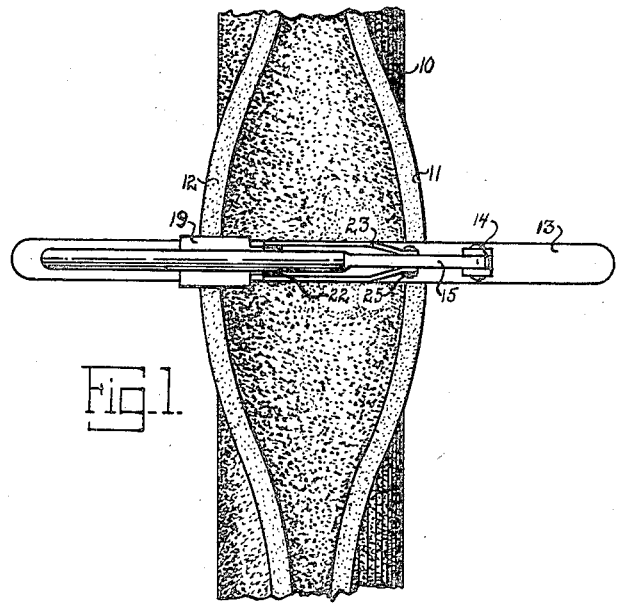
Fig. 1 is an inside top view of a portion of a tire casing with my tool in place expanding the bead of the same.
Figure 2:
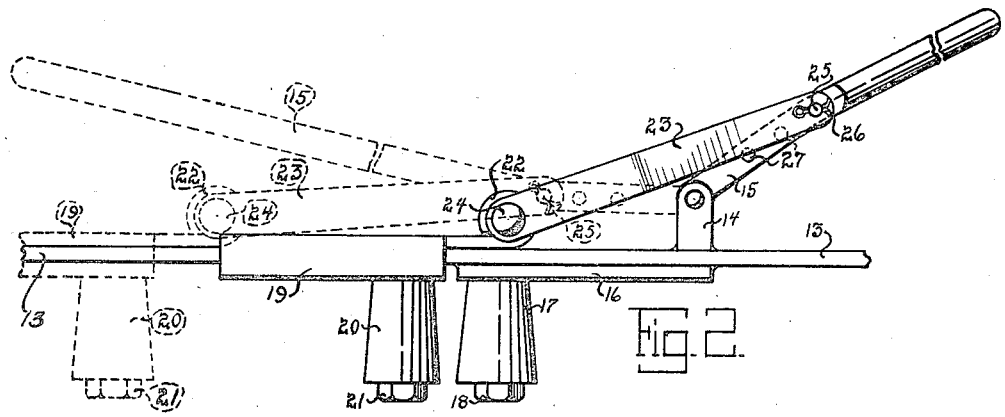
Fig. 2 is an enlarged side plan view of my device in a closed position and showing its open position in dotted lines.
Figure 3:
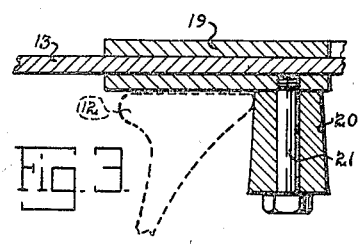
Fig. 3 is an enlarged sectional view of the slide and its attendant tapered roller.

Referring to the drawing, I have used the numeral 10 to designate an ordinary automobile casing having the ordinary bead strips 11 and 12 about its inner circumference. The numeral 13 designates the base portion of my device which is an elongated substantially flat strip of steel or similar material. The numeral 14 designates a bracket rigidly secured to the base member 13 as shown in the drawing. The numeral 15 designates a hand lever pivotally secured at one of its ends to the bracket 14. This lever 15 is flattened for a substantial distance from the end that is pivotally secured to the bracket 14 and then bent slightly to the right and has the balance of its length formed into a handle member as shown in Fig. 2. The numeral 16 designates a plate rigidly secured to the lower side of the base member 13 and having one of its ends adjacent the longitudinal center of the base member 13. The numeral 17 indicates a tapered roller rotatably mounted by a bolt or like 18 to this centrally located end of the plate 16, extending downwardly therefrom and having its smaller end adjacent the plate 16 as shown in Fig. 2. The numeral 19 designates a slide slidably embracing the base member 13 to the left of the plate 16 and which has near its innermost end a tapered roller 20 rotatably secured thereto by a bolt or like 21 as shown in Fig. 2. The thickness of this slide 19 is of the same approximate thickness as the plate 16 thereby allowing the rollers to operate in the same plane as will be appreciated by reference to Fig. 2 of the drawing. The rollers 17 and 20 are duplicates. The numeral 22 designates a sleeve integrally formed on the inner end of the slide 19. The numeral 23 designates two operating links having one of their ends pivotally secured to the sleeve 22 by a bolt or like 24. These operating elements extend on each side of, and parallel to, the lever 15 and have their other ends pivotally, detachably secured to the handle member 15 by a bolt or like 25 which is held in place by a cotter key or similar retainer 26. These operating links 23 form the connection between the lever and the slide 19 so that any manual actuation of the lever 15 will slide the member 19 back or forth on the base member 13. The numeral 27 indicates a plurality of spaced apart holes cut in the flat portion of the lever 15 so that the operating elements 23 may be secured to the lever 15 at any one of several points of its length consistent with the size and type of casing to be spread.

The practical operation of my device is as follows: The bolt 25 is placed through the elements 23 and a desired hole 27 of lever 15. The lever 26 is then moved to the left to bring the tapered rollers 17 and 20 adjacent each other. These rollers are then inserted between the beads of the tire casing. The handle lever 15 is then manually moved to the right and into a position as shown by dotted lines in Fig. 2 causing the element 23 to move to the left and moving the slide 19 and its downwardly extended roller 20 to an extended position, thus spreading the tire casing. When the handle member is pushed all the way down a reversal of leverage occurs due to the bend in the lever 15 causing the handle member to remain tight or locked when the device is in its expanded position. By grasping both ends of the base member 13 the device may be pushed or pulled around the inner circumference of the tire thus progressively exposing the inner surface of the tire for inspection. The device will remain in constant contact with the tire by virtue of the tapered rollers which will have a tendency to cause the beads of the tire to creep to positions adjacent the plate 16 and the lower part of the slide 19.

It will be noted that when the casing is being spread a greater amount of resistance is encountered as the spreading action increases. Most of the spreading action in my device occurs as the lever passes a central vertical position and thus is pushing downwardly toward the base member 13 when the greatest amount of spreading action is experienced, thereby aiding the spreading action instead of hindering it, as would be the case if the greater amount of spreading action took place while the handle member was being moved in the direction of the spread. Also for this reason my device has no tendency to detach itself when placed in an expanded position. My device is highly portable, easily operated, adjustable and efficient in use. One individual can easily operate my device and, due to the rollers 17 and 20, no injury to the tire casing will result from the application of my device. The rollers prevent injury to the bead of the tire, allowing the tool to be moved about for inspecting various places in the tire, and holds the tool in close contact with the casing beads, preventing the tool from becoming disengaged from the tire while being used. My device, furthermore is positive in operation and simple in application.

Some changes may be made in the construction and arrangement of my improved tire spreading tool without departing from the real spirit and purpose of my invention, and it is my intention to cover by my claims any modified forms of structure or use of mechanical equivalents which may be reasonably included within their scope.

I claim:

1. In a device of the class described, a base member, a lever having one of its ends pivotally secured to the upper side of said base member, a downwardly extending tapered roller rotatably secured to said base member and having its smaller end extending upwardly, a member slidably mounted on said base member, an operating link pivotally connecting said lever and said slidably mounted member, a second downwardly extending tapered roller rotatably secured to said slidably mounted member and having its smaller end extending upwards; said rollers moving away or toward each other when said lever is manually actuated.

2. In a device of the class described, a base member, a slide element slidably embracing said base member, a lever member pivotally secured to one side of said base member, a plurality of spaced apart holes in said lever member, a bearing upon said slide element, an operating element pivotally secured at one end to said bearing, a means for operatively securing the other end of said operating element to said lever through any of said holes in said lever, a tapered roller member having its smaller end rotatably secured to the other side of said base member and its larger end extending downwardly at right angles to said base member, and second roller rotatably mounted parallel to said first mentioned roller on said slide element; said lever capable of moving said operating element for sliding said slide element with relation to said base member and force said rollers apart parallel to each other.

3. In a tire spreading tool, a base member, a tapered roller designed to engage the bead of a tire rotatably secured to said base member, a second roller designed to engage the bead of a tire slidably and rotatably secured to said base member parallel to said first mentioned roller, a lever member pivotally secured to said base member for facilitating the movement of said rollers away from and parallel to each other for spreading the beads of a tire apart; said lever being bent to remain in position when said second mentioned roller is in an extended position due to the toggle action occurring when said lever has passed its maximum thrust.

4. In a device of the class described, a base member, a lever having one of its ends pivotally secured to the upper side of said base member, a downwardly extending roller rotatably secured to said base member, a member slidably mounted on said base member, an operating link pivotally connecting said lever and said slidably mounted member, a second downwardly extending roller rotatably secured to said slidably mounted member; said rollers moving away or toward each other when said lever is manually actuated.

CHARLEY BYERS.